United States Patent [19]

Temple et al.

[11] 4,203,190
[45] May 20, 1980

[54] METHOD FOR CONNECTING SEWER PIPES TO MANHOLES

[76] Inventors: Lowell D. Temple, 2415 Meyer Rd., Fort Wayne, Ind. 46803; Richard L. Williams, 9180 Parker Rd., Harrod, Ohio 45850

[21] Appl. No.: 915,770

[22] Filed: Jun. 15, 1978

[51] Int. Cl.$^2$ .............................................. B23P 11/02
[52] U.S. Cl. ...................................... 29/451; 29/235; 285/230
[58] Field of Search .......................... 29/235, 450, 451; 285/192, 230, 189, 157 R

[56] References Cited

U.S. PATENT DOCUMENTS

| | | | |
|---|---|---|---|
| 2,468,924 | 5/1949 | Courtier | 285/192 X |
| 2,763,055 | 9/1956 | Hardy | 29/450 |
| 2,807,079 | 9/1957 | Josephson | 29/235 |
| 3,289,286 | 12/1966 | Belanger | 29/451 UX |
| 3,348,850 | 10/1967 | Scales | 285/230 X |
| 3,787,078 | 1/1974 | Williams | 285/189 |
| 3,958,313 | 5/1976 | Rossborough | 29/157 R |
| 3,982,777 | 9/1976 | Martin | 29/450 X |

FOREIGN PATENT DOCUMENTS 224569 7/1910 Fed. Rep. of Germany .
24848 of 1909 United Kingdom ..................... 285/189
1337540 11/1973 United Kingdom ..................... 285/189

*Primary Examiner*—Charlie T. Moon
*Attorney, Agent, or Firm*—Albert L. Jeffers

[57] ABSTRACT

A method for connecting a sewer pipe to a larger pipe or manhole wherein the connection between the pipe and manhole opening is sealed by means of an elastomeric gasket or boot. In one embodiment of the invention, the pipe is inserted into the manhole opening and an annular elastomeric gasket is positioned over the annular space between the pipe and opening. An extensible jack, which has an annular plunger element having a diameter substantially equal to that of the gasket, is braced against the wall of the manhole opposite the opening and extended so as to press the gasket between the opening and pipe. In an alternative embodiment, a rigid ring is inserted within one end of an elastomeric boot such that the outer diameter of the boot-ring assembly is slightly larger than the inner diameter of the opening. The boot is inserted into the opening up to the enlarged end, the jack is braced against the opposite wall of the manhole and extended thereby pressing the gasket and ring into the opening. Due to the elastomeric nature of the boot, it is compressed between the manhole opening and the rigid ring so that a compressive watertight seal is achieved.

7 Claims, 6 Drawing Figures

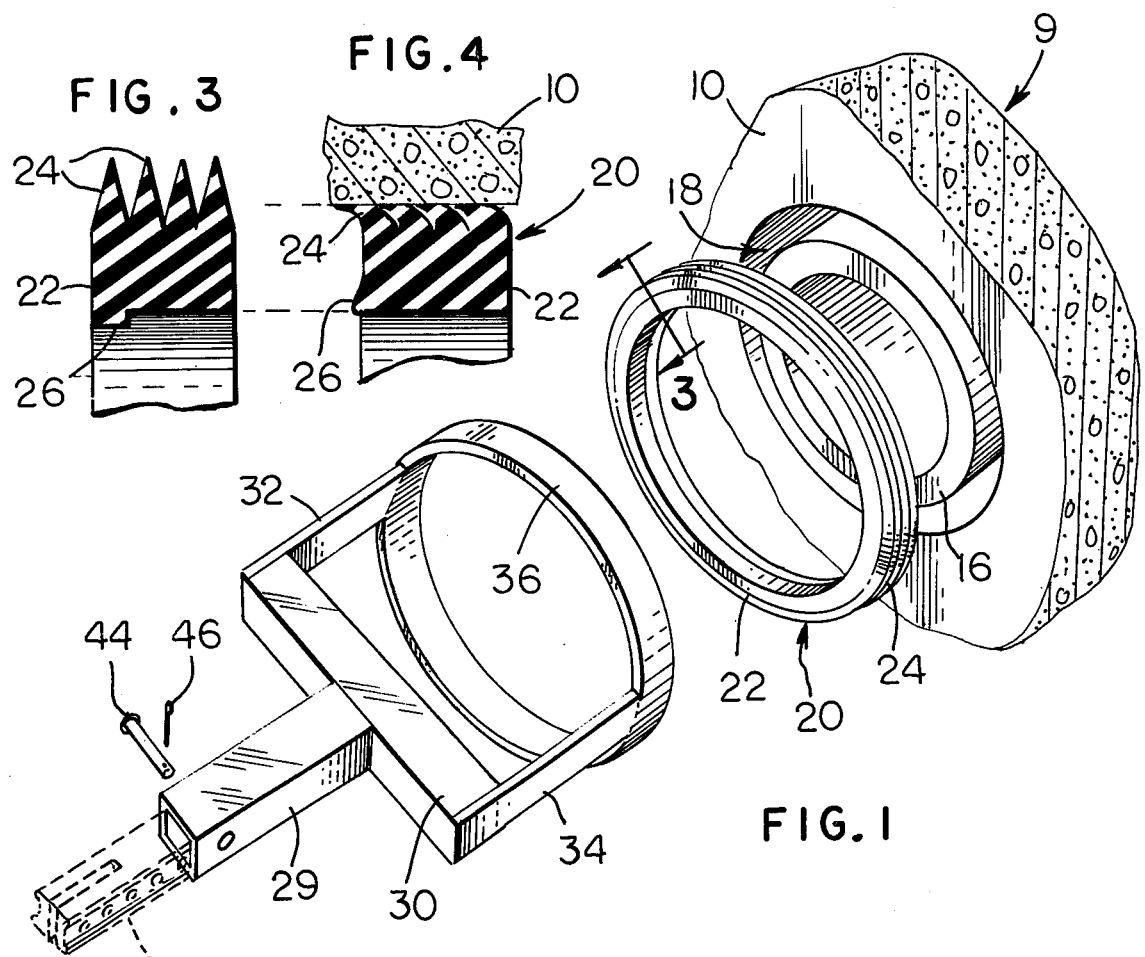
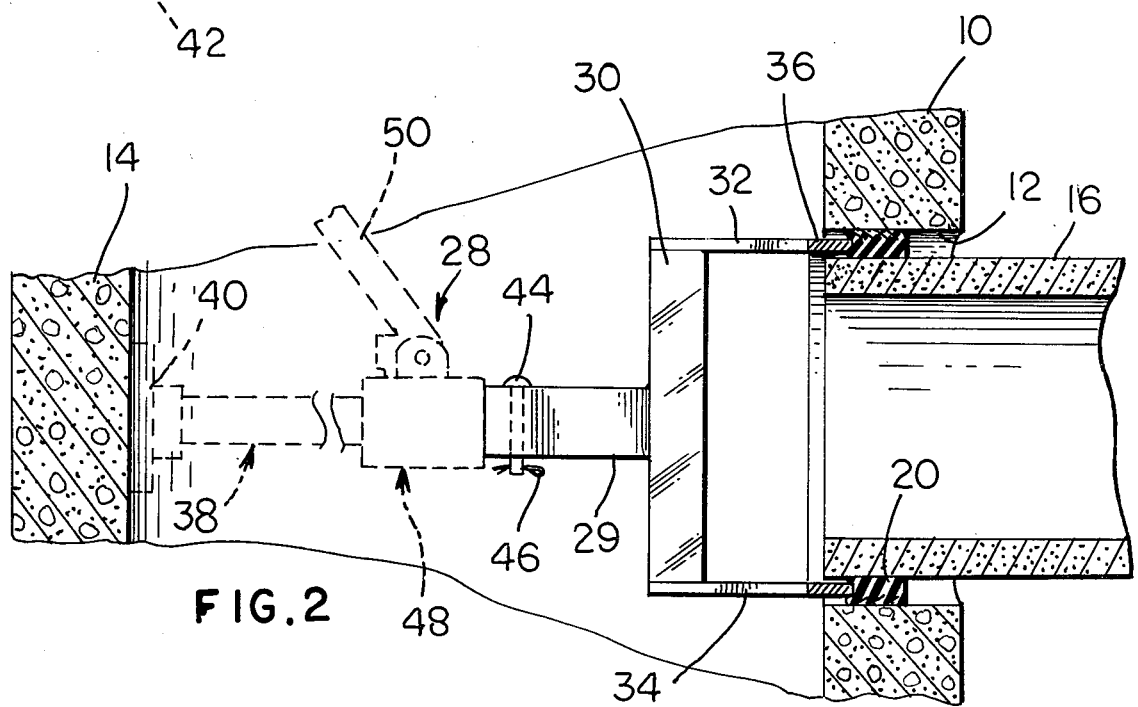

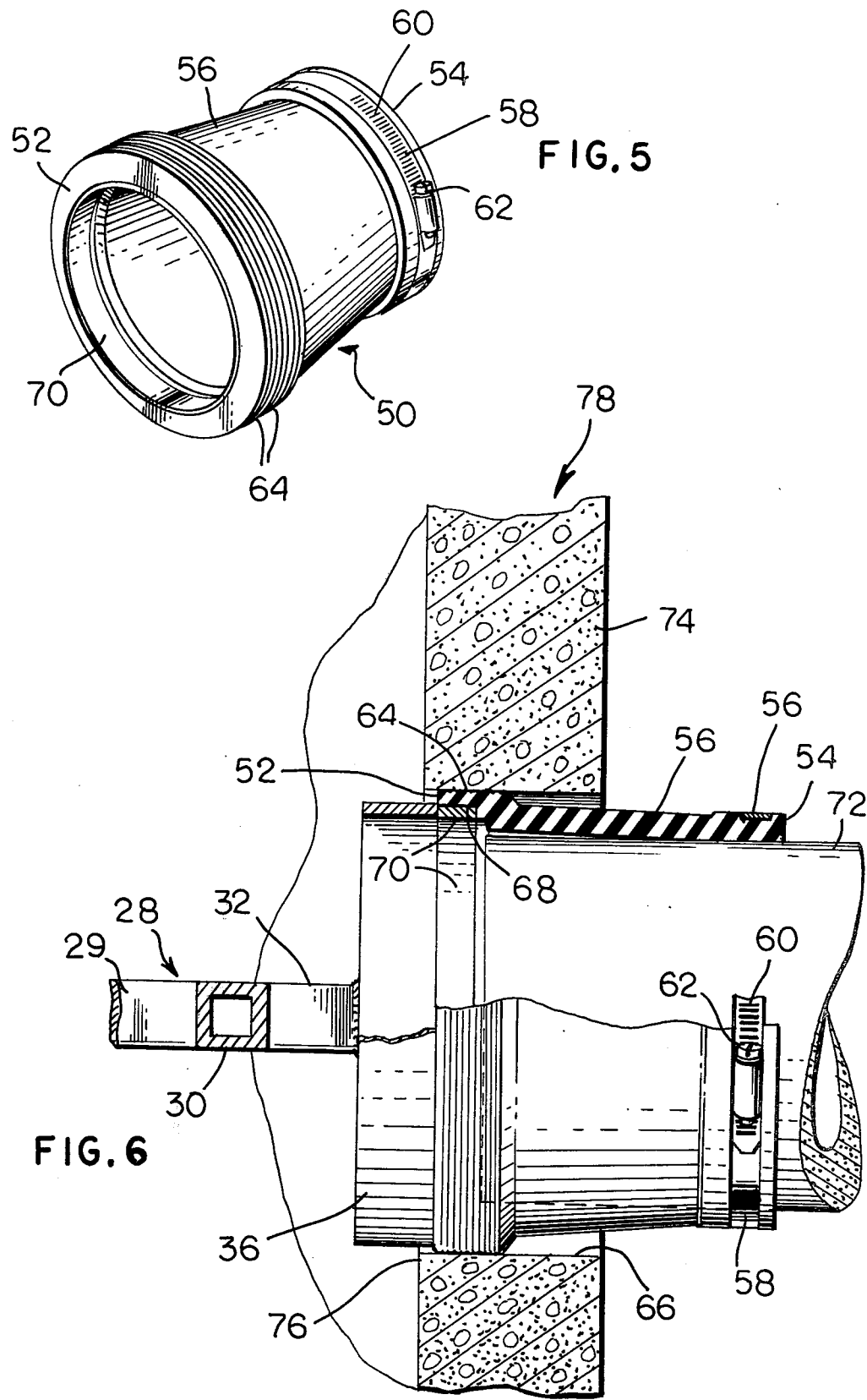

METHOD FOR CONNECTING SEWER PIPES TO MANHOLES

BACKGROUND OF THE INVENTION

The present invention relates to a method for sealingly connecting a smaller diameter sewer pipe to a larger pipe or manhole through the use of an elastomeric gasket.

In order to provide watertight connections between sewer pipes and manholes, it has become common practice to employ elastomeric rubber gaskets which are compressively clamped to the pipe and to the inner surface of the manhole opening. Since the gaskets are flexible, they tolerate a considerable amount of misalignment between the pipe and opening occurring during installation or at some later time due to soil settling around the manhole or pipe.

One such gasket is disclosed in U.S. Pat. No. 3,787,078 and comprises an elastomeric ring having resilient flexible flanges which provide a fluid-tight seal when pressed into a tapered opening in the manhole. The sewer pipe, which is equipped with such a ring or gasket, is crowded into the tapered passage so that the flanges deflect to engage the walls of the passage and provide a seal.

Another prior art gasket is disclosed in U.S. Pat. No. 3,958,313 and comprises a flexible boot having an external contracting clamp on one end for clamping the gasket to a sewer pipe or the like, and an internal expanding clamp on the opposite end. To connect the boot to the manhole opening, the boot is located within the opening with the internal clamp in its non-expanded state, and an over-center toggle mechanism is then locked to expand the clamp so as to compress the boot between it and the internal surface of the opening. One disadvantage to this last device is that there is always the possibility of failure of the toggle mechanism resulting from chemical attack caused by the effluent carried by the pipe or by environmental conditions. Furthermore, shifting of the pipe or manhole during installation or subsequently through shifting of the supporting ground may cause unlocking of the toggle mechanism. Obviously, this would result in loss of the seal between the gasket and opening thereby resulting in leakage.

SUMMARY OF THE INVENTION

The present invention is concerned with a method of connecting a sewer pipe to a manhole or the like wherein an improved seal between the pipe and manhole is achieved.

This is accomplished by providing an elastomeric annular gasket or boot having an outer diameter slightly larger than the inner diameter of the manhole opening and then pressing the gasket into the opening so as to compress the gasket between the opening and an annular rigid member which is an integral one-piece ring in one embodiment, and is the pipe itself in the other embodiment. This enables substantially increased compressive forces to be exerted on the elastomeric gasket without resorting to permanently installed devices having moving parts which are prone to failure.

The gasket is pressed into place by means of an extensible jack which is braced against the opposite wall of the manhole and includes an annular plunger element adapted to exert axial force on the gasket over a circular area coaxial with the gasket.

Specifically, the present invention contemplates a method of connecting a pipe to a manhole or the like having an opening therein and a wall opposite the opening, said method comprising the steps of: providing an elastomeric annular gasket member having an outer diameter slightly larger than the inner diameter of the manhole opening; providing an extensible jack having one end adapted to axially engage the gasket; positioning the gasket over the opening; with the other end of the jack braced against the manhole wall, extending the jack to cause one end to engage the gasket and press the gasket into the opening in which it is then compressively retained; and inserting the pipe within the gasket.

In one embodiment of the present invention, one end of the pipe is inserted into an opening in the manhole which has a diameter greater than the outer diameter of the pipe. An annular elastomeric gasket having an inner diameter approximately equal to the outer diameter of the pipe is then positioned over the end of the pipe that is within the manhole opening, and the gasket is pressed simultaneously over the pipe and into the opening to a position concentric with the pipe and opening such that it is tightly compressed between the pipe and opening.

In another embodiment of the invention, a circular, substantially rigid ring is inserted in one end of the gasket, with the outer diameter of the gasket having the ring inserted therein being slightly larger than the inner diameter of the opening. The gasket and ring assembly is then pressed into the opening to a position where the ring, gasket, and opening are concentric and the gasket is tightly compressed between the opening and the ring. The pipe is then inserted through the other end of the gasket and the gasket is clamped around the pipe.

It is an object of the present invention to provide a method of sealingly connecting a sewer pipe to a manhole or the like wherein increased compressive forces may be exerted on the sealing gasket.

It is a further object of the present invention to provide a method for sealingly connecting a sewer pipe to a manhole or the like wherein the pipe may first be positioned within the manhole opening and then the gasket inserted therearound.

A still further object of the present invention is to provide a method for sealingly connecting a sewer pipe to a manhole or the like wherein the use of permanently installed devices having moving mechanical parts is avoided.

These and other objects and features of the present invention will become apparent from the detailed description of the invention considered together with the drawings.

BRIEF DESCRIPTION OF THE DRAWINGS

FIG. 1 is an exploded perspective view of the elements employed in performing the method according to one embodiment of the present invention;

FIG. 2 is a sectional view showing the manhole gasket of FIG. 1 inserted;

FIG. 3 is an enlarged, sectional, fragmentary view taken along line 3—3 of FIG. 1 and viewed in the direction of the arrows, FIG. 4 is an enlarged fragmentary sectional view of the gasket compressed between the manhole opening and pipe;

FIG. 5 is a perspective view of a manhole gasket employed in the method according to another embodiment of the present invention; and FIG. 6 is an enlarged sectional view showing the gasket of FIG. 5 being inserted in the manhole opening.

DETAILED DESCRIPTION

Referring now to the drawings and in particular to FIGS. 1 to 4, the method according to one embodiment of the present invention will be described. The manhole 9, which is generally circular in shape, includes one wall portion 10 having an opening 12 therein and an opposite wall portion 14 which is located directly opposite opening 12. Generally speaking, the manhole 9 is made of concrete and is sufficiently large to accommodate a person working therein.

Sewer pipe 16 is generally made of concrete, but for some applications they may be made of vitrified clay or a suitable plastic, such as polyvinyl chloride. Pipe 16 is inserted within opening 12 which, as can be seen, has an inner diameter which is larger than the outer diameter of pipe 16. Opening 12 and pipe 16 are generally circular in cross section and the relative diameters thereof are selected such that the annular space 18 therebetween is sufficiently small to cause compression of the gasket 20 when it is pressed therein.

The purpose of gasket 20 is to effect a liquid-tight seal between pipe 16 and opening 12 and to afford freedom of movement between pipe 16 and manhole 9 to compensate for misalignment which occurs during installation or is caused by subsequent shifting of the supporting soil for the manhole 9 and pipe 16.

To assure a good seal even though there may be misalignment, gasket 20 is made of an elastomeric material such as neoprene or other rubber-like material and comprises an annular base portion 22 having a plurality of triangular ribs 24 extending radially therefrom. Ribs 24, since they are separated by grooves, have an apparent flexibility which is greater than that of base portion 22. As will be described below, this results in an improved seal between opening 12 and gasket 20. If desired, gasket 20 may be provided with an annular flange portion 26 having a smaller inner diameter than the outer diameter of pipe 16, which results in greater compression of gasket 20 in the area between flange 26 and the rib 24 directly above it.

To press gasket 20 around pipe 16 and into opening 12, there is provided an extensible jack mechanism 28. Jack 28, which may be made of steel, comprises a center member 29 to which is welded to cross-member 30 having a pair of connecting arms 32 and 34 welded thereto. An annular plunger element 36 is welded to arms 32 and 34 and is of approximately the same diameter as the centerline of gasket 20. The remainder of jack mechanism 28 is shown in dotted line in FIG. 2 and may be a suitable mechanism whereby a member connected to center member 29 is extended in a direction parallel to the axis of pipe 16.

For example, jack 28 may comprise a post member 38 having a base plate 40, a connecting member 42 secured to center member 29 by means of pin 44 and cotter pin 46, and a jacking mechanism 48 which causes post 38 to be incrementally extended as handle 50 is operated. By way of example, jack mechanism 48 may be fixedly connected to connecting member 42 and post 38, which is telescopically received within member 42, may be provided with teeth engaged by a ratchet within mechanism 48. As lever 50 is pivoted back and forth, the ratchet will incrementally extend post 38.

Alternatively, mechanism 48 may comprise the jacking mechanism of the type employed in bumper jacks supplied with U.S. manufactured automobiles. In this case, mechanism 48 would slide over post 38, which would telescope directly into center member 29 and would be slidably received therein rather than being pinned as in the case of the jack described above. As lever 50 is pivoted back and forth, the ratchet within mechanism 48 will engage the teeth on post 38 and extend post 38 against wall 14.

The particular jack mechanism is not the subject of the present invention and any suitable mechanism may be employed. For example, mechanism 48 could be a hydraulic cylinder which causes post 38 to extend as lever 50 is pumped back and forth. Alternatively, a screw jack could be employed.

To make the connection between pipe 16 and manhole 9, pipe 16 is first inserted into opening 12 and gasket 20 is positioned over the end of pipe 16 in alignment with annular space 18. Base plate 40 is then braced against wall 14 and plunger element 36 is aligned with gasket 20. As lever 50 is operated, the jack will be extended and plunger element 36 will press gasket 20 into space 18.

Gasket 20 is thicker than annular space 18 so that as it is pressed therein, it will be tightly compressed thereby providing a liquid-tight seal. As gasket 20 is pressed in opening 18, ribs 24 will be deflected as shown in FIG. 4 and will provide the desired seal even though some misalignment may be present. Flange 26 will be compressed and distorted as it is forced between opening 12 and pipe 16 so as to assume the shape shown in FIG. 4. The substantially greater degree of compression at this point will further improve the seal between pipe 16 and opening 12. When gasket 20 has been inserted to the desired degree, jack 28 will be retracted and removed.

An alternative embodiment of the present invention is illustrated in FIGS. 5 and 6. The elastomeric gasket or boot 50 is made of any suitable material, such as neoprene, having the desired degrees of elasticity, chemical and environmental resistance, and strength. Gasket 50 comprises a larger diameter annular portion 52 at one end, a smaller diameter annular portion 54 at the other end, and a frustoconical portion 56 therebetween. The smaller diameter end 54 is provided with an annular groove 56 within which pipe clamp 58 is received. Clamp 58 is shown as a screw-type clamp having teeth 60 which are engaged by the threads of screw 62. As screw 62 is turned, clamp 58, which comprises an overlapping band, will tighten on itself.

The larger diameter end 52 is provided with ribs 64 which deform when compressed so as to conform to the irregularities of the surface of opening 66. Larger diameter end 52 includes an annular step 68 within which a substantially rigid, integral steel ring 70 is inserted. The inner diameter of step 68 may be slightly smaller than the outer diameter of ring 70 so that a moderately tight fit is achieved.

With ring 70 inserted in step 68, the outer diameter of end portion 52 is greater than the inner diameter of opening 66 so that when the gasket is inserted within opening 66, that area of portion 52 which is positioned between ring 70 and opening 66 will be tightly compressed thereby forming the desired seal.

The gasket 50 is inserted in the following manner. Either with or without pipe 72 being positioned within gasket 50, ring 70 is inserted in annular step 68. The smaller diameter end 54 of gasket 50 is then inserted in opening 66 within the wall 74 of the manhole 78 up to the point where larger diameter portion 52 abuts the face 76 of wall 74 adjacent to opening 66. Jack 28, which may comprise any one of the jacks described above, is then braced against the opposite wall (not shown) of manhole 78 and annular plunger element 36 is positioned against the exposed face of ring 70. Jack 28 is then extended so as to cause plunger element 36 to press ring 70 and gasket 50 within opening 66. Because ring 70 is substantially inflexible, that area of end portion 52 positioned between ring 70 and opening 66 will be tightly compressed thereby forming the desired seal. If pipe 72 has not already been inserted through the smaller diameter end 54, this will be done at this time and clamp 58 will be tightened so as to clamp end 54 to pipe 72. Jack 28 will then be retracted and removed.

The advantage in using a jack to press the gaskets 20 and 50 in place is that the interference fit between gaskets 20 and 50 and openings 12 and 66 respectively, can be much greater. This results in much greater compression of the gasket so that the seal is improved. A disadvantage to first inserting the gasket over the pipe and then forcing both the pipe and gasket into the opening is that the gasket is likely to slip on the pipe unless the degree of interference between the gasket and the opening is reduced. With the embodiment of the invention shown in FIGS. 1 to 4, however, the pipe is already positioned and may be held firmly in place while the gasket is jacked on. In the embodiment of FIGS. 5 and 6, an integral ring is used in place of the expandable rings taught by the prior art and since the ring is jacked into the opening together with the gasket, much greater compressive forces on the jacket can be achieved.

While this invention has been described as having a preferred design, it will be understood that it is capable of further modification such as jacking the gasket on from outside the manhole. This application is, therefore, intended to cover any variations, uses, or adaptations of the invention following the general principles thereof and including such departures from the present disclosure as come within known or customary practice in the art to which this invention pertains and fall within the limits of the appended claims.

I claim:

1. The method of connecting a pipe to a manhole or the like comprising:
    inserting one end of the pipe into an opening in the manhole, said opening having a diameter greater than the outer diameter of the end of the pipe, said manhole having a wall opposite the opening,
    providing an annular elastomeric gasket having an inner diameter approximately equal to the outer diameter of the end of the pipe, said gasket including a face normal to the axis of the gasket,
    positioning the gasket over the end of the pipe that is within the manhole opening,
    bracing an extensible jack against the wall of the manhole opposite the opening and extending the jack to engage the face of the gasket and to exert force thereon in a direction parallel to the axis of the pipe so as to press the gasket simultaneously over the end of the pipe and into the opening to a position concentric with the pipe and opening, said gasket being tightly compressed between the pipe and opening.

2. The method of connecting a pipe to a manhole or the like comprising:
    inserting one end of the pipe into an opening in the manhole, said opening having a diameter greater than the outer diameter of the end of the pipe, said manhole having a wall opposite the opening,
    providing an annular elastomeric gasket having an inner diameter slightly less than the outer diameter of the end of the pipe and an outer diameter slightly greater than the manhole opening, said gasket including a face normal to the axis of the gasket,
    positioning the gasket over the end of the pipe that is within the manhole opening,
    bracing an extensible jack against the wall of the manhole opposite the opening and extending the jack to engage the face of the jacket and to exert force thereon in a direction parallel to the axis of the pipe so as to press the gasket simultaneously over the end of the pipe and into the opening to a position concentric with the pipe and opening, said gasket being tightly compressed between the pipe and opening.

3. The method of claim 2 wherein the jack includes an annular plunger element which exerts force on the gasket in a circular area between the inner diameter and outer diameter thereof.

4. The method of claim 2 wherein said gasket includes an inwardly extending annular flange portion having an inner diameter smaller than the outer diameter of the pipe.

5. The method of connecting a pipe to a manhole or the like having an opening therein and a wall opposite the opening:
    providing an elastomeric gasket member one end of which is annular and has an outer diameter larger than the inner diameter of the manhole opening,
    an annular, substantially rigid ring being received in the annular end of the gasket member,
    providing an extensible jack having one end adapted to engage the gasket and ring assembly at a plurality of points adjacent the circumferential periphery of the assembly,
    positioning the gasket over the opening,
    with the other end of the jack braced in abutment with the manhole wall opposite the opening, extending the jack to cause said one end to engage the gasket and ring assembly at said points adjacent its periphery and press the gasket and ring assembly into the opening in which it is compressively retained, and
    connecting the pipe to the gasket.

6. The method of claim 7 wherein the jack includes an annular plunger element which presses against the ring in a circular area coaxial with the ring.

7. The method of claim 5 wherein the jack engages the ring and exerts force on the ring in a direction parallel to the axis thereof.

* * * * *